United States Patent [19]

Hulsman

[11] Patent Number: 4,934,180
[45] Date of Patent: Jun. 19, 1990

[54] TESTING CONTAINER SEALS

[75] Inventor: William H. Hulsman, Falmouth, Mass.

[73] Assignee: Benthos, Inc., North Falmouth, Mass.

[21] Appl. No.: 252,737

[22] Filed: Oct. 3, 1988

Related U.S. Application Data

[63] Continuation-in-part of Ser. No. 89,328, Aug. 25, 1987, which is a continuation of Ser. No. 879,077, Jun. 26, 1986, abandoned.

[51] Int. Cl.$^5$ .............................................. G01M 3/36
[52] U.S. Cl. ....................................... 73/49.3; 73/49.8
[58] Field of Search ................ 73/49.3, 52, 49.8, 49.2

[56] References Cited

U.S. PATENT DOCUMENTS

| 1,447,701 | 3/1923 | White | 73/49.3 X |
| 1,825,699 | 10/1931 | Landrum | 73/49.3 |
| 1,974,026 | 9/1934 | Hicks | 73/49.3 |
| 2,093,429 | 9/1937 | Foss | 73/52 |
| 2,695,515 | 11/1954 | Ward et al. | 73/37 |
| 3,751,972 | 8/1973 | Haas | 73/45.4 |
| 3,930,401 | 1/1976 | Filler | 73/49.2 |
| 3,973,249 | 8/1976 | Yokote et al. | 340/242 |
| 4,117,718 | 10/1978 | Hayward | 73/52 |
| 4,188,819 | 2/1980 | Egee et al. | 73/52 |
| 4,326,408 | 4/1982 | Kanoh | 73/49.3 |
| 4,409,818 | 10/1983 | Wyslotsky et al. | 73/49.3 |
| 4,747,298 | 5/1988 | McDaniel | 73/49.3 |

FOREIGN PATENT DOCUMENTS 209624 6/1957 Australia .
57-17833 1/1982 Japan .

Primary Examiner—Hezron E. Williams
Assistant Examiner—Joseph W. Roskos
Attorney, Agent, or Firm—Fish & Richardson

[57] ABSTRACT

Leak detector for use in detecting defective flange-shaped seals between lid and body portions of a package. A pressure chamber is provided for isolating the external edge of the seal and applying test pressure thereto. Containment of the pressure chamber includes sealing pressure applied mechanically to the flange-shaped package seal during testing, but this sealing pressure does not affect seal testing because it is appropriately limited by a self-compensating biasing of the mechanical seal. Also disclosed is a leak testing method that involves directing gas over a flexible lid at sufficiently high velocity to lift the lid at gross defects in a seal and inject gas through the gross defects. Also disclosed is a package design that employs channels to direct gas into a seal region.

28 Claims, 5 Drawing Sheets

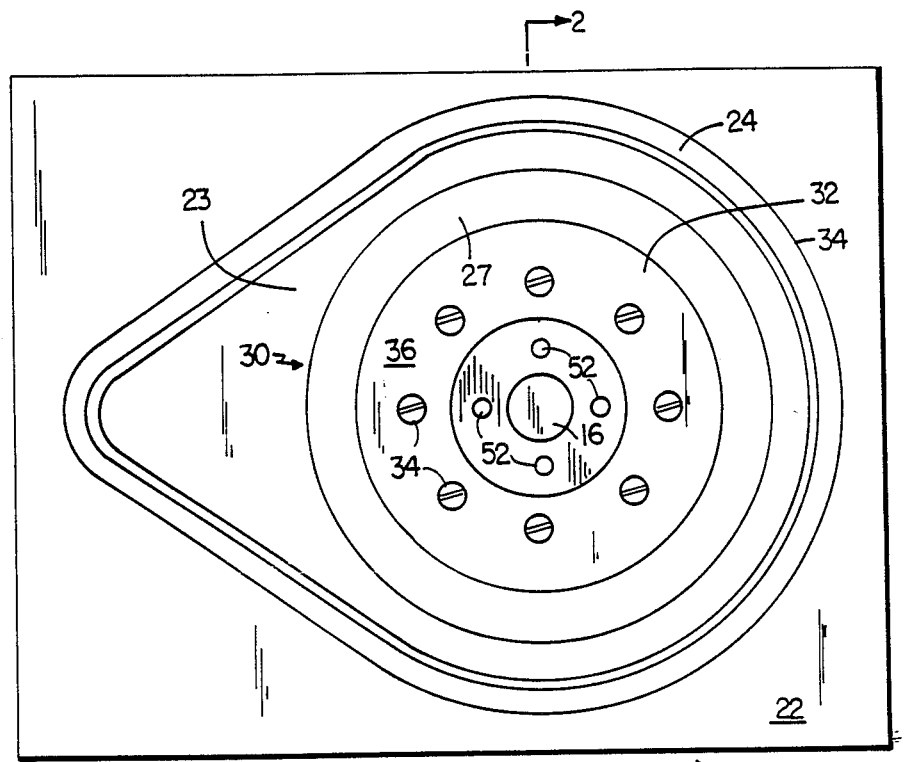
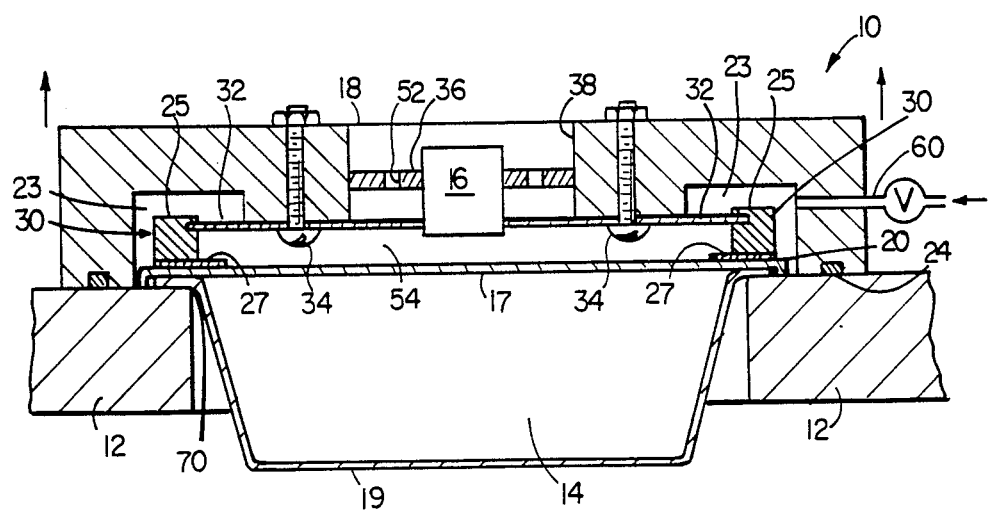
FIG.1
FIG.2

PRESSURIZED AIR →

TESTING CONTAINER SEALS

This application is a continuation-in-part of U.S.S.N 089,328 filed Aug. 25, 1987 now U.S. Pat. No. 4,774,830, which was a continuation of U.S.S.N. 879,077, filed June 26, 1986 (now abandoned).

BACKGROUND OF THE INVENTION

This invention relates to a novel process for detection of leaky seals in containers and apparatus for carrying out this process. The invention is related particularly to detecting leaks in packages having a flexible lid material sealed to a container body such that the resulting seal structure forms a flange-like structure on the sealed package.

Many leak-detecting machines have been suggested over the years. Some such machines utilize some method of infusing air into a leaky container. One such Pat. No. 4,326,408 to Kanoh describes how leakage of air into a watchcase is detected. Most such apparatus, however, is used in packaging food or other objects which are sealed in sterile packages. Thus U.S. Pat. Nos. 2,093,429 to Foss; 3,751,972 to Hass; and 1,974,026 to Hicks show methods of testing cans. Proximity sensors are known for use in detecting movement of a container wall as seen in U.S. Pat. No. 4,188,819. More recently Wyslotsky et al, in U.S. Pat. No. 4,409,818 utilizes displacement sensors to detect air blown through defective seals between two plastic sheets (one a container structure, the other a lid structure) of a package.

It will be evident that the Wyslotsky device depends upon the availability of unsealed package area for effective containment of test gases. Moreover, it will be noted that Wyslotsky's test pressure exerts a significant pull on the package webs and thereby tends to pull a seal open. This limits somewhat the strength of seal utilized with that apparatus.

SUMMARY OF THE INVENTION

Therefore, it is a principle object of the invention to be able to provide dependable, fast and sensitive leak-detection in packages having sealed flange areas formed of a lid and flanged body portions of the container.

It is a particular object of the invention to be able to accomplish such testing which the container is maintained at atmospheric pressure and with pressurized test fluid only selectively applied to the seal-exposing edge of the sealed flange.

Another object of the invention is to achieve a seal between ambient pressure and test pressure by means of a mechanical, pressure-retaining seal applied directly to the sealed flange itself and to do this without pinching-off defects in the seal which must be identified.

Another object of the invention is to provide a self-compensating mechanical seal for application to the package seal during testing.

Still another object of the invention is to provide a process for effecting such testing which accommodates the geometrical and structural nature of flexible packaging materials to assure detection.

Other objects of the invention will be obvious to those skilled in the art on their reading of this disclosure.

The above objects have been substantially achieved by construction and use of a leak-detecting apparatus having means to support a sealed flange of a package to be tested and a pressure chamber assembly adapted to be moved downwardly to form a pressure chamber. The pressure chamber is mechanically sealed against the sealed flange around the container. The exterior edge of said sealed flange is isolated from ambient pressure and enclosed within a pressure chamber.

Another advantageous feature of the invention provides that a gasketed seal means bearing against the sealed flange portion of the package, i.e., the portion of the package under test, is biased such that only a light sealing pressure is initially applied to said flanged portion of the package to be tested. When test pressure is applied, the light sealing pressure is automatically increased, e.g., by the action of the gas pressure on the seal means bearing against the seal under test. This action maintains the differential pressure across the package seal at a suitably low level thereby avoiding both damage to the package seal and the sealing of leaks to be detected.

It has been found that a gasket of this mechanical seal means is preferably neither too soft nor too hard for optimum performance. Shore A durometer values of about 20 to 100 are preferred. This allows the apparatus to be used with a wide variety of packages and seals without incurring any problems associated with both excessive deformation of the gasket when pressure is applied and excessive rigidity of the gasket. Either factor, when combined with imperfections in the quality of webs used to form the package, can result in excessively-high localized pressure on the flange and damage the seal to be tested.

The apparatus of the invention can be constructed in any number of configurations. A preferred configuration is one wherein the pressure chamber assembly surrounds a package and seals off the periphery of a flange-shaped package seal which itself surrounds the periphery of a package. In such circumstances, it is particularly desirable to have initial light-sealing pressure, (e.g. a few ounces of pressure per lineal inch of seal) exerted by the pressure chamber assembly, to be applied by a thin, resilient, sheet forming biasing means and arranged in generally annular relationship with respect to the pressure chamber, and extending canti-levered (as viewed in section) outwardly from a portion of the structure, or housing, of said pressure chamber such that the sheet is forced toward the package seal by test pressure. The seal means which is to bear against the package seal is thus pushed tighter by increased pressure on the resilient sheet. The mechanical seal is thereby automatically adjusted for air pressure which may invade the package seal under test while, at the same time, maintaining its effective sealing of the pressure chamber assembly against the package.

In the preferred mode of the invention, a proximity sensor is centrally carried on the seal assembly and acts to determine the position of the pressure-flexed lid of the container.

The apparatus is typically operated at a sensitivity such that a 0.005- to 0.010-inch movement of the package lid causes deflection.

The sensor illustrated below is a linear proximity sensor available from Electro Corporation of Sarasota, Florida. It is of the type that generates a field below the sensor. When a metal object enters the filed, such as a flexible aluminum lid construction, eddy currents are induced and these currents are detected by the sensor. The strength of the sensed signal is a measure of how close the metal-bearing lid is to the sensor. Other sensor means can be used which can sense the initial position of a lid and the position assumed during leak testing. Among such proximity sensors are ultrasonic position-detecting sensor, e.g., of the general type available from Polaroid Corporation of Cambridge, Massachusetts. Ultrasound detecting sensors of the type which can listen to a leak may be used as a detecting means, also. Such sensors are sold by American Gas & Chemical Co., Ltd. of Northvale, New Jersey. It has been noted that Ultrasound detectors can be used in conjunction with the leak detectors of the invention to listen for air leaking through the lid and thereby extending the function and use of the leak detectors of the invention which, in the form described herein, assume the integrity of the container and lid structure.

In another aspect, the invention, in general, features detecting a leak in a defective seal of a package having an edge seal that is formed by a bond between overlapping edge portions of the walls of the package, one wall having a flexible portion that changes shape as the volume in the package changes, and one wall being a flexible lid of the package. The method includes applying a gas to the exposed outer edges of the edge portions and along the outer surface of the lid at sufficiently high velocity to lift the lid at any gross leak in the edge seal and inject the gas into the container through the gross leak. The flexible wall deflects in response to the flow of gas through the leak, and this deflection is detected.

In preferred embodiments, the gas is applied to the edge portions and along the outer surface at a low pressure, and the outer surface of the lid is thereafter sealed to prevent air flow along the lid surface, and higher pressure gas is applied to the exposed outer edge portions; this permits gross leaks to be detected by the high-velocity gas at low pressure and smaller leaks to be detected by the higher pressure gas when the lid is sealed. The lid is sealed by a gasket member that moves to close a gap between the gasket member and the lid in response to an increase in pressure in the gas provided to the edge portions. Two opposing blocks are used to provide a chamber around the edge portions, and a hollow flexible ring that deforms when subjected to an increase in pressure is used to deflect the gasket member to provide a seal between one block and the lid. The package includes a container having a flange and a lid sealed to the flange, the overlapping edge portions being the flange and the opposing portions of the lid; one block has a lip used to support the flange, and the other block carries the hollow ring and gasket member. The gap is about 0.020" to 0.050", and the pressure is increased from 0 psi to about 10 psi before sealing of the lid and is thereafter increased to about 70 psi.

In another aspect, the invention features a design for a sealed package that facilitates detection of leaks in an edge seal of the package by gas injected through the leaks into the package. The edge seal is formed by a bond between overlapping edge portions of the walls of the package. One wall has a flexible portion that changes in shape as the volume in the package changes. The overlapping edge portions include bond portions and unbonded portions extending outward from the bond portions. The unbonded portions include elongated recesses in a wall leading to the bond portions to provide channels between the overlapping edge portions leading to the bond portions. The channels facilitate detection of the leaks in the edge seal by gas injected through the leaks into the package.

The preferred embodiments, the package includes a container having a flange and a lid sealed to the flange, the overlapping edge portions being the flange and the opposing portions of the lid. The container is circular, and the channels are radial channels in the container. The unbonded portion can also include a recess that surrounds the bonded portion and communicates with the radial channels.

ILLUSTRATIVE EMBODIMENTS OF THE INVENTION

In this application there are described preferred embodiments of the invention and suggested various alternatives and modifications thereof, but it is to be understood that these are not intended to be exhaustive and that the other changes and modifications can be made within the scope of the invention. The suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

FIG. 1 is a plan view of a leak-detecting apparatus showing the relationship of a pressure chamber assembly to a container being tested of the invention taken along the Section 1:1 of FIG. 2.

FIG. 2 is a section in elevation of a leak-detecting apparatus of the invention showing the relative position of a package being tested to a testing sensor and seal means.

Figure 3:
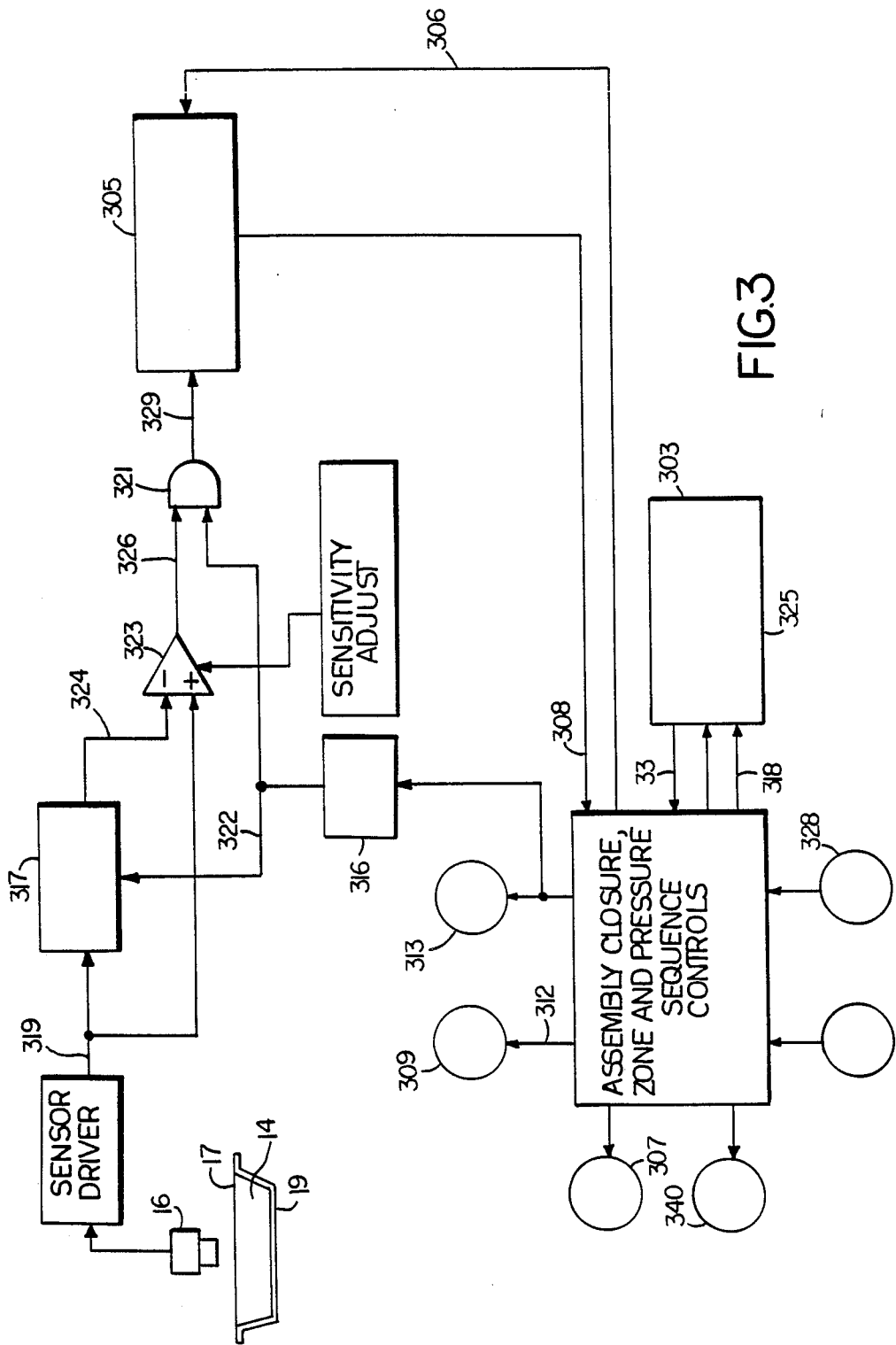
FIG. 3 is a schematic diagram indicating the use of a proximity sensor in the process of the invention.

It will be understood that the apparatus of the invention will include suitable support means for positioning the container to be tested with respect to the leak-detecting means. Moreover, the air is admitted and allowed out of the system through valves and with the use of electronic controls which are commonly used in the engineering arts. These aspects of the apparatus are not novel in themselves and are not described in detail herein. Many different versions of such control systems can be used, and they can be readily selected and utilized by engineers familiar with the design of pneumatically and/or electronically actuated automatic test apparatus. Normally such apparatus will be packages in an appropriate exterior housing with whatever pneumatic and electronic controls desirable for its operation.

Referring to FIGS. 1 and 2, it is seen that a leak-detecting apparatus 10 comprises support means 12 for a container 14 such that container 14 is positioned directly under proximity sensor 16 centered in pressure chamber assembly 18 which is positioned to seal the flange 20 of container 14 against support means 12. The sealing assembly will be positioned by conventional pneumatic or hydraulic prime mover which is not illustrated since such systems are well know and easily implemented by those skilled in the art. When such seals is accomplished, a pressure chamber 23 will form an annular zone around the package, but the pressure on the package will be limited to that exerted on the external edge of the flanged seal 20 formed by an aluminum foil lid 17 and container body 19.

Pressure chamber assembly 18 comprises an outer sealing block portion 22. A sealing gasket 24 is carried within block 22 and adapted to seal block 22 against container-support means 12 with whatever pressure is exerted on the seal by the prime mover. Assembly 18 further comprises an inner seal means 26 comprising a gasket support 25 and a sealing gasket 27 of a cast two-component polyurethane having a Shore A durometer of about 80. The gasket is, in turn, mounted on an inner sealing block 30 which is attached to the outer sealing block 22 by a thin, e.g., about 0.008-inch thick, annular piece of beryllium copper metal. This thin metal section is a spring means 32 as will be further described below. Screws 34 hold annular spring 32 to the outer sealing block 22.

Inward from inner sealing block 22 is a sensor-support ring 36 fastened to the inner wall 38 of sealing block 22. Ring 38 is sealed about and holds the centrally-positioned proximity sensor 16 and also comprises spaces conduits 52 which assure that the volume 54 above container 14 will be at ambient pressure maintained outside the pressure chamber. In most circumstances, atmospheric pressure will be convenient.

Referring to FIG. 2, it will be seen that an enclosed volume, in reality pressure chamber 23, is formed by sealing of the seal assembly 18 against container 14 and container support 12. Test air, typically at 20 to 80 pounds per square inch pressure above atmosphere, is admitted into chamber 23 through conduit 60, as will be described below.

When the fluid is admitted, the pressure will tend to force its way through defects in the container seal 70 which is formed between aluminum lid member 17 and plastic container body 19. This may be an adhesive bonded-seal or a heat seal, or another seal which is intended to be substantially air tight. This test pressure bears against annular spring 32 and helps to maintain the sealing pressure of the inner sealing block 30 against flange 20 of the container even as pressure may build up in the seal itself. Sufficient compensating pressure will find its way into any seal defects and, thus, such defects will not be sealed off by the inner seal.

When a container is properly positioned, as seen in FIG. 2, and test pressure is applied to the edge of seal, air will be forced through defects in the seal and into container 14, forcing the lid upwardly, increasing the output signal of proximity detector 16.

In operation of the apparatus, container 14 is brought into test position on support 12. Thereupon the sealing assembly 18 is caused to descend into sealing position as shown in FIG. 2. At this point the interior seal block 25 and its gasket 27 rest only lightly on the sealed flange portion 20 of the container. Test fluid, usually a gas like air or nitrogen or helium, is used to bring chamber 23 up to test pressure. Once pressure is reached, the output of the proximity detector 16 is taken as indicative of the initial vertical position of lid 17. It is suggested that this initial reading be delayed for a very short time, e.g., 0.05 to 0.3 seconds, in order to allow the package to adapt its initial test geometry to the pressure. The actual test time will depend on the nature of a particular package. It can be less than one second (but will commonly be about 2 to 3 seconds and usually be from 1 to 60 seconds). Continuous reading of the sensor output will be obtained as a measure of the vertical position of the lid, i.e., the position assumed as a result of any gas flow through seal defects into the container.

The height of the lid will be used in determining whether the seal is defective. It is convenient to have a "reject signal", e.g., a red light or buzzer or both activated on sensing of a rejected package.

In any event, the pressure chamber is depressurized, the sealing assembly is raised and the package is removed for another cycle.

Other modes of operation can also be used. For example, time could be utilized as a constant test period and the failure of the sensor output to indicate an undesirable upward movement of the device during the set time would then indicate a suitable seal.

FIG. 3 illustrates schematically the sensory control of a seal integrity tester constructed according to the invention. Conventional pneumatic and electrical apparatus such as solenoid valves and pneumatic conduits are not shown in an detail because these will be understood by those skilled in the art on reading the description.

With a package 14 to be tested in position, a test button is used to initiate a test cycle. A timer 303 is set to a maximum test time. Simultaneously, a reset signal is sent to bi-stable flip-flop 305 via conduit 306. A visual indication of a suitable state of the flip-flop is sent to green light 307 via electrical conduits 308 and 310. Also, valve 309 is actuated via conduits 308 and 312 to bring the sealing assembly (18 as seen in FIGS. 1 and 2) down to form the pressure chamber 23 around the seal to be tested.

Then, valve 313 is opened to allow gas to enter the sealing assembly. The timer is started. Then, after a 0.1 second delay 316, (in which time the mechanical shifts in package configuration due to the stresses of the pressure and sealing action may occur) the test time will be started via conduit 318. When the 0.1 second delay ends, sample-and-hold circuit 317 will go to the hold state via conduit 322. The signal to be held at this time is a signal from sensor 16 which is indicative of the vertical position of a metal package lid. This signal level on conduit 319 from sensor 16 will be held on conduit 324 even though the line 319 signal continues to vary. The signal on conduit 322 also enable the read gate 321. Read gate 321 is used to avoid setting the flip-flop at times during chamber closure, pressurization, and other times when testing is not taking place.

If the seal under test has no leaks, the signal level on conduit 319 will remain the same as the signal level on line 324. Thus, the output signal from comparator 323 on conduit 326 will not change and therefore will not allow a "set" command signal via conduit 329. The logic level signal on conduit 308 will not change, and the green "OK" lamp 307 will remain on.

The timer 303 will time down to zero and terminate the test by a signal sent through conduit 331 to the sequence controls. Alternately the test can be terminated by a stop button 328. In either case both air valves 309 and 313 simultaneously operate to depressurize and open to lift the sealing assembly.

As indicated above, if the seal being tested has a leak, the distance between the lid puffed up by gas leaking into the package and the sensor will become smaller. In such a case, the signal levels on conduit 319 and conduit 324 will be different because the conduit 319 signal voltage will increase as the lid continues to rise. Comparator 323 will send a signal based on this difference through conduit 326, thereby enabling read gate 321 and causing a "set" logic command to be output by bi-stable flip-flop 305. The resultant signal on conduit 308 will put out the green light 307 and put on the red light 340. The timer will normally stop at this time. The pressure chamber will be depressurized and raised.

Figure 4:
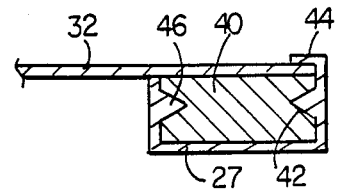
FIG. 4 is a section showing the construction of a reinforced gasket seal useful with the invention.

It is important that gasket 27 be radially stable with respect to the apparatus and package. Therefore it is often advisable to reinforce the gasket with an internal support structure 40 as seen in FIG. 4 wherein a polyurethane gasket 27 of Shore A durometer of about 80. The annular spring 32 is fixed to the aluminum support structure 40 and positioned against a small overlap in structure 40 at 44. V-grooves 46 are used to help hold the gasket 27 in position.

The apparatus described herein is already constructed to have a leak-sensitivity of about 0.2 cubic centimeter per second leak rate.

Figure 5:
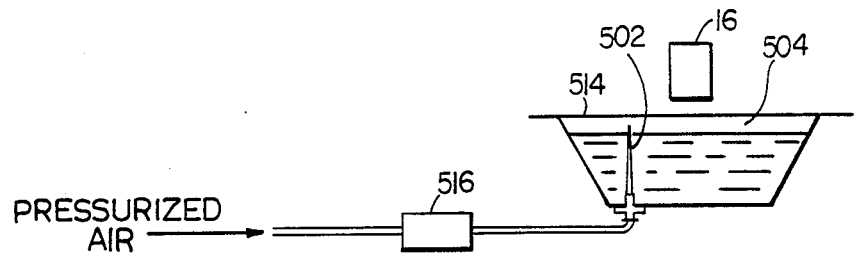
FIG. 5 is a schematic diagram showing a calibration scheme useful with the invention.

In addition to the features of the invention described above, it is sometimes advisable to provide a calibrating means with the apparatus as seen in FIG. 5. One such calibration means can comprise a hypodermic needle-like conduit 502 adapted for insertion into the headspace 504 of a container 514. A small calibrated leak device 516 (of the type commercially available) controls the amount of simulated leak gas being passed into the package.

Figure 6:
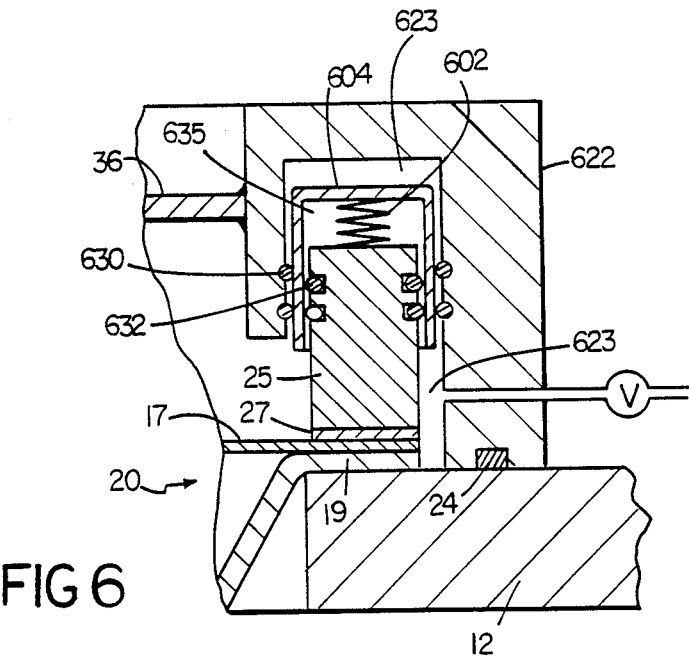
FIG. 6 is an alternative dual-force seal embodiment of the invention.

FIG. 6 illustrates schematically another sealing assembly apparatus according to the invention. A spring 602 is utilized to limit initial pressure on flange 20. However, as pressure increases in pressure zone 623, it tends to force the gasket 627 downwardly as a result of further pressure exerted on the spring by spring cap 604. The sealing pressure on gasket 627 however is independent from the mechanical sealing pressure exerted by the prime mover on gasket 24 via the principle annular sealing block 22. O-rings 630 and 632 provide gas seal means between the pressure zone 623 and ambient and the spring chamber 635. The rings also provide sufficient flexibility and movement to allow the differential pressure to be effective at gaskets 627 and 24.

It is further noted that the apparatus can be used in a suction mode with the "pressure chamber" having a pressure below the ambient pressure. In such a case, the deflection of the lid, indicative of a leak, would be downward.

Moreover, in the suction mode, it is possible to utilize chemical sensors to detect minute quantities of materials in the container which are sucked out and use these quantities as a criterion of leak severity.

Figure 7:
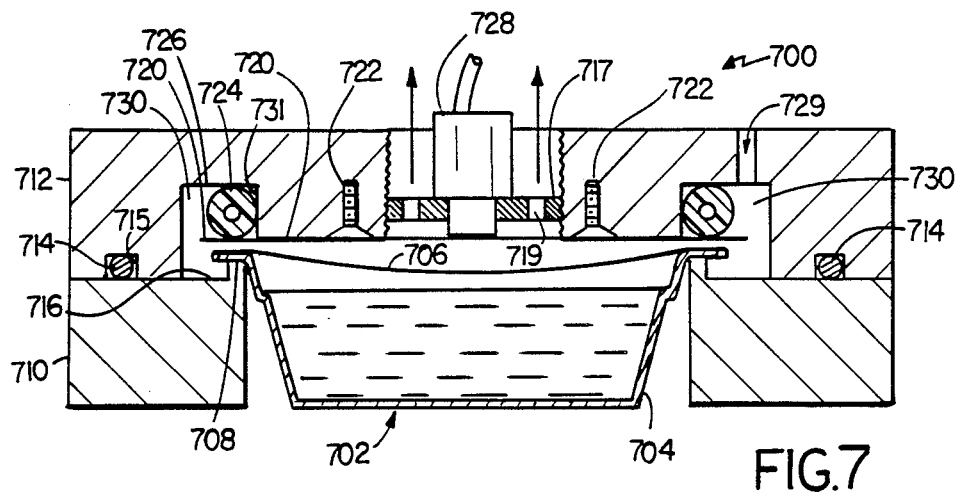
FIG. 7 is a diagrammatic vertical sectional view of an alternative leak-detecting apparatus according to the invention in one position.
Figure 8:
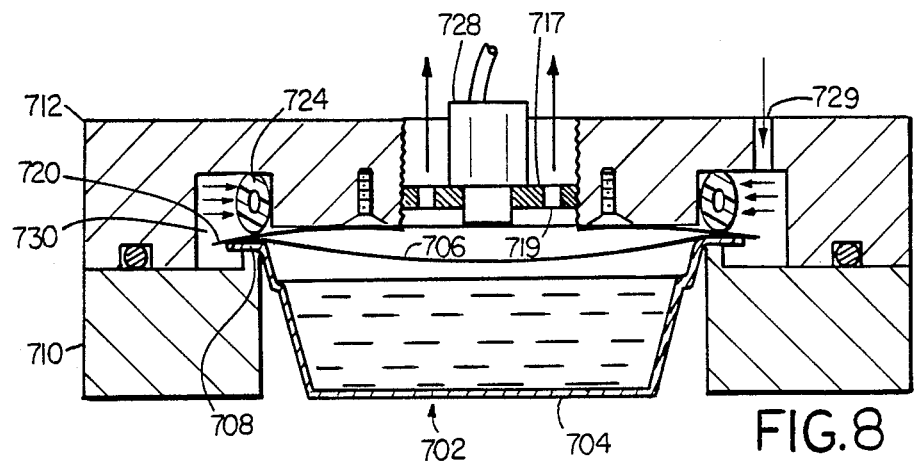
FIG. 8 is a diagrammatic partial vertical sectional view showing a portion of the FIG. 7 apparatus in a different position.
Figure 9:
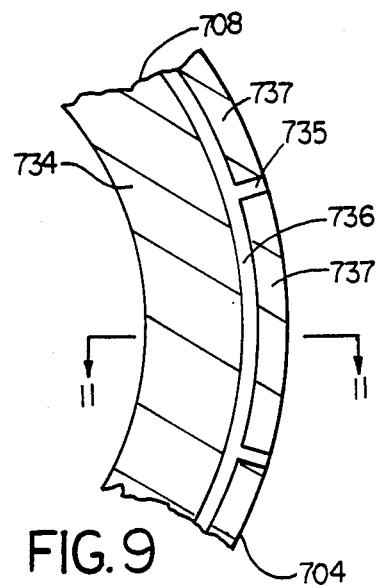
FIG. 9 is a partial plan view of an edge portion of a flanged container including features to facilitate detection of leaks.
Figure 10:
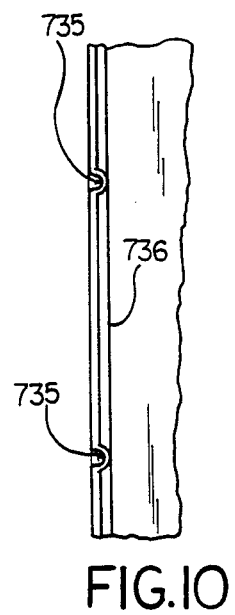
FIG. 10 is a partial side elevation of the FIG. 9 package.
Figure 11:
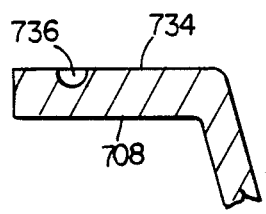
FIG. 11 is a partial vertical sectional view, taken at 11—11 of FIG. 9, of the FIG. 9 container.

Referring to FIGS. 7 and 8, there is shown alternative leak detection apparatus 700 for detecting leaks in a defective seal of package 702, which has an edge seal that is formed by a bond between overlapping walls of the package. Package 702 is circular and includes rigid package container 704 and flexible lid 706, sealed around its outer edge portion to facing flanged portion 708 of container 704.

Apparatus 700 includes lower circular block 710, having central cavity 712 for receiving container 704 therein, and facing upper block 712. O-ring 714 in recess 715 in upper block 712 provides a seal around the periphery of blocks 710, 712. Flanged portion 708 is supported on lip 716 extending around cavity 712 on lower block 710.

Gasket member 720 opposes lip 716 and is secured by eight bolts 722 (which are provided around gasket member 720) to upper block 712. Gasket member 720 is made of 0.008" stainless steel sheet and retains hollow flexible O-ring 724 between it and the lower surface 726 of upper block 712. Flexible O-ring 724 is made of soft flexible plastic material; e.g., an O-ring 724 was made from tubing (available under the Tygon R-3603 Shore A hardness 55 trade designation from T.M. Norton Co.) that had a 0.375" outer diameter and 0.250" inner diameter and was butt glued end-to-end to form a ring. Sensor 728 is connected to upper block 712 via plate 717 having rat holes 719 through it. Between blocks 710, 712 is annular chamber 730. The outer portion of gasket member 720 extends into chamber 730, and flexible O-ring 724 is supported within chamber 730 above gasket member 720 and against the radially-outward facing surface 731 of block 712. When hollow O-ring 724 is in the at-rest position shown in FIG. 7, gasket member 720 is spaced from upper lid surface 735 of lid 703 by a gap of about 0.025"; other gaps can be used; preferably the gap is between 0.020" to 0.050".

In operation of leak detection apparatus 700, compressed air enters chamber 730 through passage 729 and slowly rises in pressure from 0 psi to the test pressure of 70 psi in about 0.2 to 0.3 second. Air flows from chamber 730 through the gap between the upper, outer surface of lid 706 and the bottom of gasket member 720 and out through vents 719. Gasket member 720 is not in contact with the lid during this initial period, and the high velocity air flow over lid 706 causes lid 706 to lift upward at any place where the lid is grossly not sealed to flange 708 of container 704. Air will then enter the package (blowing away any obstructing product in the gross leak) and the center of lid 706 will rise and is detected by sensor 728 to indicate a leak condition and terminate the test. If a gross leak is not detected during this initial period, the rising air pressure causes hollow O-ring 724 to collapse against surface 731, as shown in FIG. 8, at about 10 psi. The change in shape of O-ring 724 forces the outer portion of gasket member 720 downward to clamp against the outer portion of lid 706 and provide the conditions for testing of smaller leaks, as described above for the FIGS. 1-6 embodiments. An advantage of leak detection apparatus 700 is that it detects gross leaks that might otherwise go undetected if the product spills or splashes onto container flange 708 before lid 706 is sealed onto the flange. Such spilled or splashed product prevents proper sealing; a leak with product in it can be effectively sealed off by gasket pressure so that the container does not leak while in test.

Figure 12:
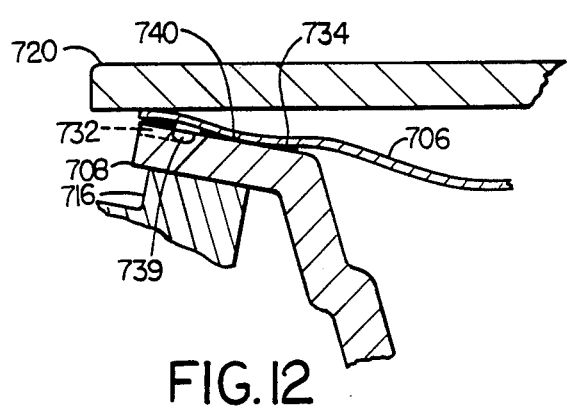
FIG. 12 is a partial vertical sectional view, taken at 11—11 of FIG. 9, showing the flange area of a package including the FIG. 9 container during a seal integrity test.

FIGS. 9-12 show an improved structure for package 702 to enhance the effectiveness of detecting leaks. The enhancement involves providing radial channels 732 leading from the outer edge of flange 708 in the rigid plastic container 704 to concentric recess 736, adjacent to bond area 734 at which lid 706 is bonded to flange 708. Channels 732 are provided via recesses 735 in unbonded area 735 of flange 704 of container 702 and the facing portions of lid 706. The distance of concentric recess 736 from the outer edge should be ⅛ to ¼ of the flange width. Referring to FIG. 12, lid 706 is shown sealed during testing via gasket member 720 to flange 708. With this configuration, test air pressure enters void region 739 through channels 732 and is applied to lid/container seal outer edge 740 (FIG. 12). There is no mechanical pressure by gasket member 720 on lid 706 at bond area 734, providing access of the high pressure air to any leaks. Gross leaks and microleaks will be easily detected, because lid 706 is able to lift upward in places where gross leaks may exist.

It is also to be understood that the following claims are intended to cover all of the generic and specific features of the invention herein described and all statements of the scope of the invention which might be said to fall therebetween.

What is claimed is:

1. A method for detecting a leak in a defective seal of a package having an edge seal that is formed by a bond between overlapping edge portions of walls of said package, one said wall having a flexible portion that changes shape as the volume in said package changes, one said wall being a flexible lid of said package, said method comprising
   providing said package,
   applying a gas to exposed outer edges of said edge portions and along the outer surface of said lid at sufficiently high velocity to lift said lid at a gross leak in said seal and inject said gas through said gross leak into said container, and
   detecting deflection of said flexible portion in response to flow of gas through a leak in said edge seal between said overlapping edge portions.

2. The method of claim 1 wherein said applying a gas is carried out at a low pressure, and further comprising sealing the outer surface of said lid so as to prevent gas flow along said outer surface and providing a higher pressure at the exposed outer edges of the edge portions than at said flexible portion, whereby gross leaks can be detected by said high-velocity gas at low pressure, and smaller leaks can be detected by said higher pressure gas.

3. The method of claim 2 wherein said lid is sealed by a gasket member that moves to close a gap between said gasket member and said lid in response to an increase in pressure in gas provided to said edge portions.

4. The method of claim 3 wherein two opposing blocks are used to provide a chamber around said edge portions, and a hollow flexible ring that deforms when subjected to an increase in pressure is used to provide with said gasket member a seal between one said block and said lid.

5. The method of claim 4 wherein wherein one said wall is provided by a container having a flange, and wherein the other said wall is a lid sealed to said flange, said overlapping edge portions being said flange and opposing portions of said lid, and wherein one said block has a lip used to support said flange, and the other said block carries said hollow, ring and said gasket member.

6. The method of claim 3 wherein said gap is about 0.020" to 0.050".

7. The method of claim 6 wherein said pressure is increased from 0 psi to about 70 psi, sealing off said lid when said pressure reaches about 10 psi.

8. Apparatus for detecting a leak in a defective seal of a package having an edge seal that is formed by a bond between overlapping edge portions of walls of said package, one said wall having a flexible portion that changes shape as the volume in said package changes, one said wall being a flexible lid of said package, said apparatus comprising
   means to apply a gas to exposed outer edges of said edge portions and along the outer surface of said lid at sufficiently high velocity to lift said lid at a gross leak in said seal and inject said gas through said gross leak into said container, and
   a deflection detector to detect deflection of said flexible portion in response to flow of gas through a leak in said edge seal between said overlapping edge portions.

9. The apparatus of claim 8 further comprising a movable sealing member that is movable from a gap position spaced from said outer surface of said lid to permit flow of said gas at high velocity along said outer surface and to a seal position sealing said outer surface of said lid to prevent gas flow along said outer surface and permit application of gas at high pressure to said exposed edge portions to detect smaller leaks.

10. The apparatus of claim 9 wherein said movable sealing member is a gasket member and further comprising means for moving said gasket member to seal said lid in response to an increase in gas pressure provided to said edge portions.

11. The apparatus of claim 10 further comprising two opposing blocks that provide a chamber around said edge portions, and wherein said means for moving comprises a hollow flexible ring that deforms in response to an increase in pressure.

12. The apparatus of claim 11 wherein one said block has a lip used to support a flange of a wall defining a container part of said package, and the other said block carries said hollow ring and said gasket member.

13. The apparatus of claim 12 wherein said other said block has a chamber surface extending transverse to said lid at a location over said lip, and said hollow ring is within said chamber along said chamber surface, whereby an increase in pressure in said chamber causes said ring to be flattened against said chamber surface and to extend toward said lid.

14. The apparatus of claim 11, wherein said means to apply gas provides gas so as to increase pressure in said chamber from 0 psi to about 70 psi, and said hollow ring and gasket member are adapted to deflect said gasket member so as to seal said lid when said pressure reaches about 10 psi.

15. The apparatus of claim 9 wherein movable sealing member is a said gasket member that is spaced from said lid by about 0.020" to 0.050" when in said gap position.

16. A method for detecting a leak in a defective seal of a package having an edge seal that is formed by a bond between overlapping edge portions of walls of said package, one said wall having a flexible portion that changes shape as the volume in said package changes, said overlapping edge portions including bond portions and unbonded portions extending outward from said bond portions, said unbonded portions including elongated recesses in a said wall leading to said bond portions to provide channels between said overlapping edge portions leading to said bond portions, said method comprising
  providing said package,
  applying a first pressure to said channels and a different second pressure to said flexible portion, and
  detecting deflection of said flexible potion in response to flow of gas through a leak in said edge seal between said overlapping edge portions.

17. A method for detecting a leak in a defective seal of a package having an edge seal that is formed by a bond between overlapping edge portions of walls of said package, one said wall having a flexible portion that changes shape as the volume in said package changes, said method comprising
  providing said package,
  applying a first pressure to exposed outer edges of said edge portions of said walls and a different second pressure to said flexible portion, and
  detecting deflection of said flexible portion in response to flow of gas through a leak in said edge seal between said overlapping edge portions,
  said applying including providing a first chamber that is partially defined by said exposed outer edges of said edge portions,
  said first chamber being partially defined by a seal member that seals against a said wall between said exposed outer edge portions and said flexible portion.

18. The method of claim 17 wherein said seal member is biased against said wall by gas pressure.

19. The method of claim 18 wherein said seal member is biased by gas pressure in said first chamber.

20. The method of claim 18 wherein said seal member is biased by gas pressure in a second chamber that is separate from said first chamber.

21. The method of claim 17 wherein two opposing blocks are used to provide said first chamber.

22. The method of claim 21 wherein one said wall is provided by a container having a flange, and wherein the other said wall is a lid sealed to said flange, said overlapping edge portions being said flange and opposing portions of said lid, and wherein one said block has a lip used to support said flange.

23. Apparatus for detecting a leak in a defective seal of a package having an edge seal that is formed by a bond between overlapping edge portions of walls of said package, one said wall having a flexible portion that changes shape as the volume in said package changes, said apparatus comprising
  means to apply a first pressure to exposed outer edges of said edge portions of said walls and a different second pressure to said flexible portion, and
  a deflection detector to detect deflection of said flexible portion in response to flow of gas through a leak in said e seal between said overlapping edge portions,
  said means to apply including first chamber means defining a first chamber that is partially defined by said exposed outer edges of said edge portions,
  said first chamber means including a seal member that seals against a said wall between said exposed outer edge portions and said flexible portion.

24. The apparatus of claim 23 wherein said means to apply comprises a seal member and means to bias said seal member against said wall by gas pressure.

25. The apparatus of claim 24 wherein said means to bias comprises means to bias using gas pressure in said first chamber.

26. The apparatus of claim 25 wherein said means to apply comprises means defining a second chamber that is separate from said first chamber, and wherein said means to bias comprises means to bias by gas pressure in said second chamber.

27. The apparatus of claim 23 wherein said means to apply comprises two opposing blocks that are used to provide said first chamber.

28. The apparatus of claim 27 wherein one said wall is provided by a container having a flange, and wherein the other said wall is a lid sealed to said flange, said overlapping edge portions being said flange and opposing portions of said lid, and wherein one said block has a lip used to support said flange.

* * * * *